UNITED STATES PATENT OFFICE.

JOHN M. STUKES, OF DELHI, LOUISIANA.

COMPOSITION OF MATTER FOR USE AS A FOOD.

1,258,059.   Specification of Letters Patent.   Patented Mar. 5, 1918.

No Drawing.   Application filed October 29, 1917.   Serial No. 199,002.

*To all whom it may concern:*

Be it known that I, JOHN MARION STUKES, a citizen of the United States, residing at Delhi, in the parish of Richland and State of Louisiana, have invented a new and useful Composition of Matter for Use as a Food, of which the following is a specification.

This invention relates to a composition of matter for use as a food, one of its objects being to provide a palatable composition which has a high food value, can be made cheaply, and can be used by adults as a breakfast food or can be used as an ingredient of prepared foods.

With the foregoing and other objects in view the invention consists of the following ingredients substantially in the proportions stated:

| | |
|---|---|
| Corn | 50% |
| Wheat | 25% |
| Leguminous seeds | 25% |

Other ingredients having high food values but of a low cost can be substituted for the leguminous seeds. One of such ingredients could be rice.

After the ingredients have been mixed they are toasted or parched in an edible oil such as olive oil, peanut oil, etc., the toasting being similar to that carried on in the production of potato chips. After the mixture has been thoroughly toasted it is ground to a fine powder and sifted. To this powdered mixture is added from ten to twenty-five per cent. of sugar, the mixture being salted and then flavored with powdered cinnamon, cloves, nutmeg or the like. It is subsequently packed and disposed of to the trade in this powdered form.

A food prepared as described can be used in its dry state or can be mixed with water, milk or the like. It can be used in making custards, puddings, etc., and is particularly desirable because an excellent food can be produced therefrom without cooking.

What is claimed is:—

1. A composition of matter for use as a food, consisting of a toasted mixture of corn, wheat and other edible seeds reduced to a finely comminuted state and combined with sugar and a flavoring substance.

2. A composition of matter for use as a food including corn, wheat, and other edible seeds toasted in an edible oil and reduced to a finely comminuted state, said mixture being combined with sugar and a flavoring ingredient.

3. A composition of matter for use as a food including corn, wheat, and leguminous seeds ground, toasted in hot edible oil and reduced to a finely comminuted state, the comminuted mixture being combined with sugar and a flavoring substance.

In testimony that I claim the foregoing as my own, I have hereto affixed my signature in the presence of two witnesses.

JOHN M. STUKES.

Witnesses:
J. E. GRAY,
W. E. TONEY.